(12) United States Patent
Demianovich, II et al.

(10) Patent No.: US 8,484,857 B2
(45) Date of Patent: Jul. 16, 2013

(54) COMPONENT FOR AXIALLY ALIGNING TWO SHAFTS THROUGH INTERMEDIARY MATERIALS

(75) Inventors: Nicholas Demianovich, II, Waukesha, WI (US); Gregory A. Gabrysiak, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 233 days.

(21) Appl. No.: 13/190,724

(22) Filed: Jul. 26, 2011

(65) Prior Publication Data

US 2013/0025145 A1 Jan. 31, 2013

(51) Int. Cl.
*G01B 5/24* (2006.01)

(52) U.S. Cl.
USPC .............................................. 33/412; 33/645

(58) Field of Classification Search
USPC .................... 33/412, 529, 613, 645
See application file for complete search history.

(56) References Cited

U.S. PATENT DOCUMENTS

| | | | |
|---|---|---|---|
| 4,115,925 A | 9/1978 | Malak | |
| 4,413,415 A * | 11/1983 | Stovall | 33/412 |
| 4,586,264 A * | 5/1986 | Zatezalo | 33/412 |
| 4,709,485 A | 12/1987 | Bowman | |
| 5,199,182 A | 4/1993 | Fowler | |
| 5,222,306 A * | 6/1993 | Neumann | 33/645 |
| 5,920,999 A * | 7/1999 | Hutter | 33/645 |
| 6,148,533 A * | 11/2000 | Hutter | 33/645 |
| 7,242,465 B2 * | 7/2007 | Lacko et al. | 33/412 |

* cited by examiner

*Primary Examiner* — G. Bradley Bennett
(74) *Attorney, Agent, or Firm* — Ziolkowski Patent Solutions Group, SC

(57) ABSTRACT

A shaft alignment component for aligning a rotatable shaft positioned within a housing of a driven device with a motor shaft of a motor positioned outside of the housing of the driven device is disclosed. The component includes a body portion having an opening formed therethrough to receive the rotatable shaft and/or the motor shaft therein, a first alignment feature configured to interface with an alignment hub on the motor to position the motor shaft along a centerline axis of the shaft alignment component, and a second alignment feature comprising a chamfered surface configured to interface with a countersunk feature on the housing. The chamfered surface is configured to interface with the countersunk feature to self-align the shaft alignment component with the housing such that the rotatable shaft of the driven device is positioned along the centerline axis of the shaft alignment component and aligned with the motor shaft.

20 Claims, 3 Drawing Sheets

COMPONENT FOR AXIALLY ALIGNING TWO SHAFTS THROUGH INTERMEDIARY MATERIALS

BACKGROUND OF THE INVENTION

The invention relates generally to electric motors and, more particularly, to alignment of a motor and rotating shaft of a driven device through an intermediate material.

Alignment of a motor and its rotating shaft so that they share an axis of rotation is important for safe, efficient operation of a motor. The purpose of alignment is to ensure that the centerline of the motor coincides exactly with the centerline of the driven rotor shaft. Alignment is essential to ensure that a machine runs smoothly with minimum vibration, as misalignment of the motor and rotor shaft can produce excessive vibration and high temperature, which can lead to premature failure of bearings, couplings, or the shaft. Alignment has to be done whenever the motor or driven machinery is dismantled or even when the machines are not running smoothly.

Proper alignment of a motor and its rotating shaft can be made more difficult when an intermediate material is included/positioned between the motor and shaft. A common example of such an arrangement is where a motor is positioned on the outside of a volume and a rotating shaft is positioned on the inside of a volume, with a housing therebetween. While most motors have a shoulder or hub thereon for aligning them with the shaft, often times this hub is not deep enough to function with the presence of an intermediate material between the motor and shaft.

A specific example of where an intermediate material is included/positioned between a motor and shaft can be found in a computed tomography (CT) imaging environment. More specifically, in many CT imaging systems a pre-patient collimator is used for shaping the x-ray beam from an x-ray source is employed. The pre-patient collimator includes a pair of blades positioned within a housing and that are adjustable relative to one another so as to vary the size of an aperture formed therebetween for allowing the x-ray beam to pass therethrough. An electric motor positioned outside the housing is provided for adjusting the blades, with the electric motor mating with a shaft positioned within the housing and connected to the blades in order to rotate the shaft and adjust the blades in response to that rotation. In the pre-patient collimator, a layer of radiation blocking material is positioned as an intermediate material between the housing and the motor to prevent excess radiation from escaping the housing into the motor or elsewhere. Thus, in many instances, it can be difficult to properly and efficiently align the motor and collimator blade shaft in a pre-patient collimator.

Therefore, it would be desirable to provide a component that enables alignment between a motor and a separate rotating shaft through one or more intermediate layers. It would also be desirable for such a component to protect the rotating shaft, provide a hard stop for moving components, and provide an easy means for disassembling the component from the motor and/or rotating shaft without the use of unique tools.

BRIEF DESCRIPTION OF THE INVENTION

The invention is directed to component that provides for the alignment of a motor and a rotating shaft of a driven device through an intermediate material Therefore, in accordance with one aspect of the invention, a shaft alignment component for aligning a rotatable shaft positioned within a housing of a driven device with a motor shaft of a motor positioned outside of the housing of the driven device is provided. The shaft alignment component includes a body portion comprising a first end and a second end and having an opening formed therethrough extending from the first end to the second end to receive at least one of the rotatable shaft of the driven device and the motor shaft therein. The shaft alignment component also includes a first alignment feature configured to interface with an alignment hub on the motor so as to position the motor shaft along a centerline axis of the shaft alignment component and a second alignment feature comprising a chamfered surface configured to interface with a countersunk feature on the housing. The chamfered surface is configured to interface with the countersunk feature to self-align the shaft alignment component with the housing such that the rotatable shaft of the driven device is positioned along the centerline axis of the shaft alignment component and aligned with the motor shaft.

In accordance with another aspect of the invention, a shaft alignment component for aligning a rotatable shaft positioned within a housing of a driven device with a motor shaft of a motor positioned outside of the housing of the driven device is provided. The shaft alignment component includes a body portion comprising a first end and a second end, with the body portion having a hollow configuration so as to include an opening formed therethrough extending from the first end to the second end to receive at least one of the rotatable shaft of the driven device and the motor shaft therein. The shaft alignment component also includes a flange positioned on the first end of the body portion, with the flange comprising a locational fit inner diameter feature configured to interface with an alignment hub on the motor so as to position the motor shaft along a centerline axis of the shaft alignment component. The shaft alignment component further includes an attachment feature positioned on the second end of the body portion configured to mate with the housing of the driven device and a chamfered surface positioned between the flange and the attachment feature that tapers down from the flange to the body portion, with the chamfered surface configured to interface with a countersunk feature on the housing. The chamfered surface interfaces with the countersunk feature to self-align the shaft alignment component with the housing upon mating of the shaft alignment component with the housing, such that the rotatable shaft of the driven device is positioned along the centerline axis of the shaft alignment component so as to be aligned with the motor shaft.

In accordance with yet another aspect of the invention, a motor and driven device arrangement includes a motor having an alignment hub and a motor shaft extending axially outward from the alignment hub and a driven device having a housing enclosing a volume and a rotatable shaft positioned within the volume that is configured to couple with the motor shaft so as to be driven thereby, with the housing including a countersunk feature formed thereon. The arrangement also includes a shaft alignment component positioned between the motor and the driven device to facilitate alignment between the motor shaft and the rotatable shaft, with the shaft alignment component further including a body portion having an opening formed therethrough configured to receive at least one of the rotatable shaft and the motor shaft therein, a first alignment feature configured to interface with the alignment hub of the motor so as to position the motor shaft along a centerline axis of the shaft alignment component, and a second alignment feature comprising a chamfered surface configured to interface with the countersunk feature on the housing so as to self-align the rotatable shaft of the driven device with the centerline axis of the shaft alignment component upon attachment of the shaft alignment component to the housing. The rotatable shaft and the motor shaft are aligned upon attachment of the shaft alignment component to the alignment hub of the motor and the housing of the driven device.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

Figure 1:
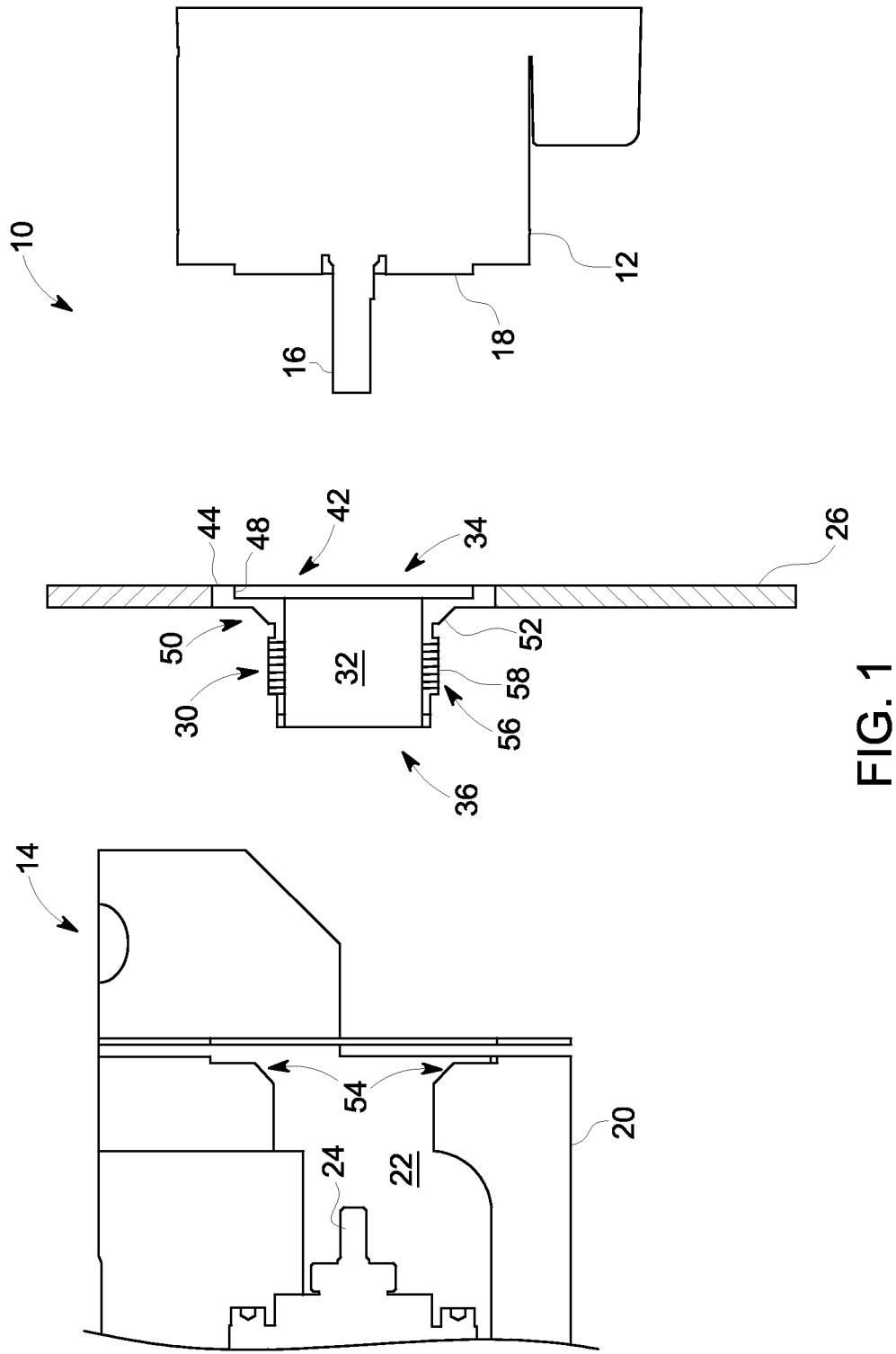
FIG. 1 is a block schematic diagram of a motor and driven device arrangement that incorporates a shaft alignment component according to an embodiment of the present invention.

Referring to FIG. 1, a motor and driven device arrangement 10 is shown according to an embodiment of the invention. The arrangement 10 includes a motor 12 and an adjacent driven machinery device 14. Motor 12 includes a motor shaft 16 extending out from the motor 12 that rotates responsive to power/torque generated thereby. A motor alignment hub 18 is provided on motor 12 and is positioned about motor shaft 16 such that motor shaft 16 is centered within the alignment hub. As shown in FIG. 1, the driven device includes a housing 20 that encloses a volume 22 of the driven device. A rotatable shaft 24 of driven device 14 is positioned within volume 22 so as to be enclosed by housing 20. The respective shafts 16, 24 may include couplings thereon (not shown) for joining the shafts together upon a proper alignment thereof in a collinear relationship.

Also included in arrangement 10 is one or more intermediate materials 26 that are positioned between motor 12 and driven machinery device 14. According to one embodiment of the invention, the intermediate material 26 is in the form of a layer of radiation blocking material configured to prevent the transfer of radiation from driven device 14 to motor 12. For example, driven device may be in the form of a pre-patient collimator in a computed tomography (CT) imaging system, with the collimator being used for shaping x-ray beams for imaging of a patient. In such an embodiment, radiation is present within housing 20 of the collimator 14, and the layer of radiation blocking material 26 is employed to prevent the escape and/or transfer of this radiation from volume 22 to motor 12 or to the ambient environment.

As shown in FIG. 1, arrangement 10 also includes a shaft alignment component 30 that functions to align the motor shaft 16 with the rotatable shaft 24 of driven device 14. The component 30 is constructed to accommodate the inclusion of the one or more intermediate materials 26 between motor 12 and driven machinery device 14. According to one embodiment of the invention, where driven device 14 is in the form of a device in which radiation is desired to be contained within housing 20, such as a pre-patient collimator as described above, component 30 is configured to block radiation from escaping housing 20. That is, component 30 may be formed of a high density material sufficient for radiation blocking, such as a tungsten alloy or steel for example. Component 30 may thus be formed of a different material than housing 20. As component 30 is constructed to accommodate a radiation blocking layer 26 between motor 12 and driven machinery device 14, the combination of component 30 and radiation blocking layer 26 may thus form an efficient barrier for blocking radiation from escaping volume 22 and transferring to motor 12 and the ambient environment.

In addition to accommodating the inclusion of intermediate material 26 between motor 12 and driven machinery device 14, the component 30 is also constructed to address the issue of aligning a motor and motor shaft on the outside of a volume/housing, such as motor 12 and motor shaft 16, with a rotating shaft on the inside of a volume/housing, such as rotatable shaft 24 within volume 22/housing 20 of driven device 14. The component 30 is configured to provide self-centering of the component to housing 20 and shaft 24 and to also provide easy alignment of the component to motor 12 and motor shaft 16.

Figure 2:
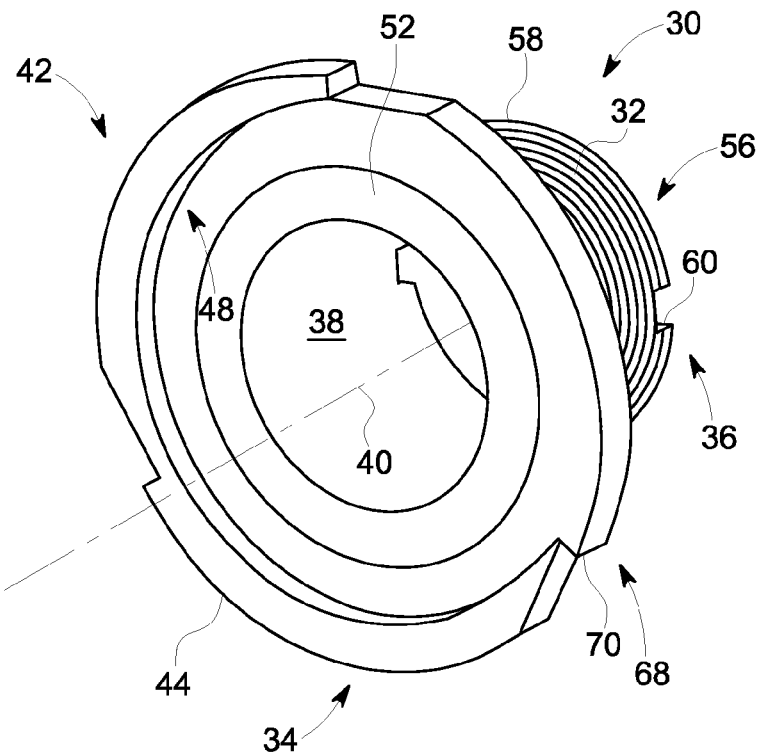
FIG. 2 is a perspective view of a shaft alignment component according to an embodiment of the present invention.

Referring now to FIG. 2, and with continued reference to FIG. 1, a detailed view of shaft alignment component 30 is shown according to an embodiment of the invention. The component 30 includes a body portion 32 having a first end 34 and a second end 36. The body portion 32 is formed to have a hollow configuration and thus includes an opening 38 formed therethrough that extends from the first end 34 to the second end 36, with the opening 38 configured to accommodate motor shaft 16 and/or rotatable shaft 24 therein. As shown in FIG. 2, a centerline axis 40 of component 30 runs axially through opening 38, extending from the first end 34 to the second end 36.

The component 30 includes a first alignment feature 42 thereon that is positioned on the first end 34 of body portion 32, with the first alignment feature 42 being configured to interface with alignment hub 18 on the motor 12 so as to position motor shaft 16 along the centerline axis 40 of the component 30. According to one embodiment, the first alignment feature 42 is formed as a flange 44 that extends radially outward from body portion 32, with the flange 44 having a thickness or "standoff distance" that is preferably equal to or greater than the thickness of an intermediate material or layer 26 (FIG. 1) that is to be positioned between motor 12 and driven device 14. The flange 44 has an outer diameter that is greater than a diameter of alignment hub 18 of motor 12 and an inner diameter 48 that is configured to form a locational fit with alignment hub 12, so as to interface component 30 with the motor alignment hub 18 by positioning the first alignment feature 42 thereabout. As shown in FIG. 1, the first alignment feature 42 thus mates with the alignment hub 18 of motor 12 through the intermediate layer 26.

The component 30 also includes a second alignment feature 50 thereon that is positioned between the first end 34 and the second end 36 of the body portion 32, such as adjacent to flange 44. According to an exemplary embodiment, the second alignment feature 50 is in the form of a chamfered surface 52 that tapers down from flange 44 to body portion 32 (chamfered surface 52 can be seen more clearly in FIGS. 1 and 3). The chamfered surface 52 is configured to interface with a countersunk feature 54 formed in housing 20, as can be seen in FIG. 1. In assembling arrangement 10, the chamfered surface 52 of component 30 interfaces with the countersunk feature 54 to self-align the component 30 with the housing 20 as the component 30 is adjoined thereto, such that the rotatable shaft 24 of the driven device 14 is positioned along the centerline axis 40 of component 30 and aligned collinearly with the motor shaft 16.

As can be seen in FIG. 2, the first alignment feature 42 is offset from the second alignment feature 50 in a direction distal from the housing 20 of the driven device 14 so as to provide for placement of the intermediate layer 26 about the first alignment feature 42 and between the housing 20 and the motor 12. That is, when the component 30 is aligned with driven device 14 and positioned relative thereto by way of the chamfered surface 52 of component 30 interfacing with the countersunk feature 54 of housing 20, the first alignment feature 42 remains offset from the housing 20, such that a space is provided for placement of the intermediate layer 26 about the first alignment feature 42 and between the housing 20 and the motor 12.

Figure 3:
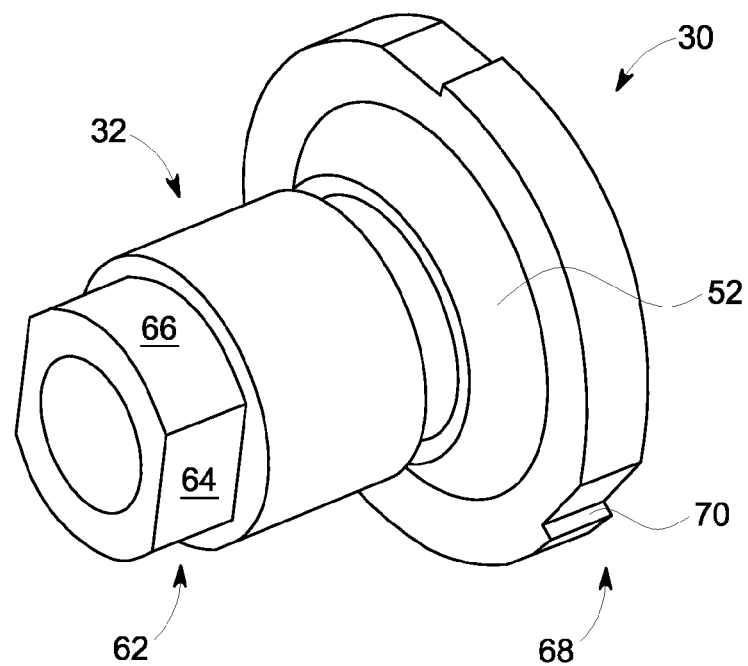
FIG. 3 is a perspective view of a shaft alignment component according to an embodiment of the present invention.

Also included on component 30 is an attachment or assembly feature 56 formed on body portion 32 that is configured to mate with the housing 20 of the driven device 14 so as to secure the component 30 to housing 20. According to one embodiment of the invention, a plurality of external threads 58 are formed on an outer surface of body portion 32, proximate to the second end 36 thereof, with the external threads 58 being configured to mate with the housing 20 in a screw-like fashion. According to one embodiment, a plurality of notches 60 is also formed on second end 36 of body portion 32, with the notches 60 configured to provide sufficient torque between the component 30 to housing 20 upon an engagement and twisting of the component 30 thereto. Another embodiment of component 30 is shown in FIG. 3 including an alternative attachment/assembly feature, but an identical chamfered surface 52 for interfacing with countersunk feature 54. As shown in FIG. 3, an attachment/assembly feature 56 is provided on second end 36 of body portion 32 in the form of a member or shaft portion 62 configured with flat portions to provide sufficient torque between component 30 and housing 20 upon engagement of the component with the housing. The member/shaft portion 62 includes a pair of opposing flat surfaces 64 and opposing curved surfaces 66. According to the embodiments of component 30 shown in each of FIGS. 2 and 3, the attachment/assembly feature(s) 56 thus, beneficially, enables securing of component 30 to housing 20 without the use of any separate additional fasteners.

Referring to FIGS. 2 and 3, component 30 is shown as also including a disassembly feature 68 thereon that provides for easy removal of component 30 from motor 12 and driven device 14, without the need for special tools for performing such removal. According to one embodiment, disassembly feature 68 is in the form of notches 70 that are formed on flange 44 of first alignment feature 42. Notches 66 allow for the component 30 to be disassembled from the housing 20 by way of common tools, such as a lever arm (e.g., screwdriver) and an impulse (e.g., hammer) to break the torque.

Figure 4:
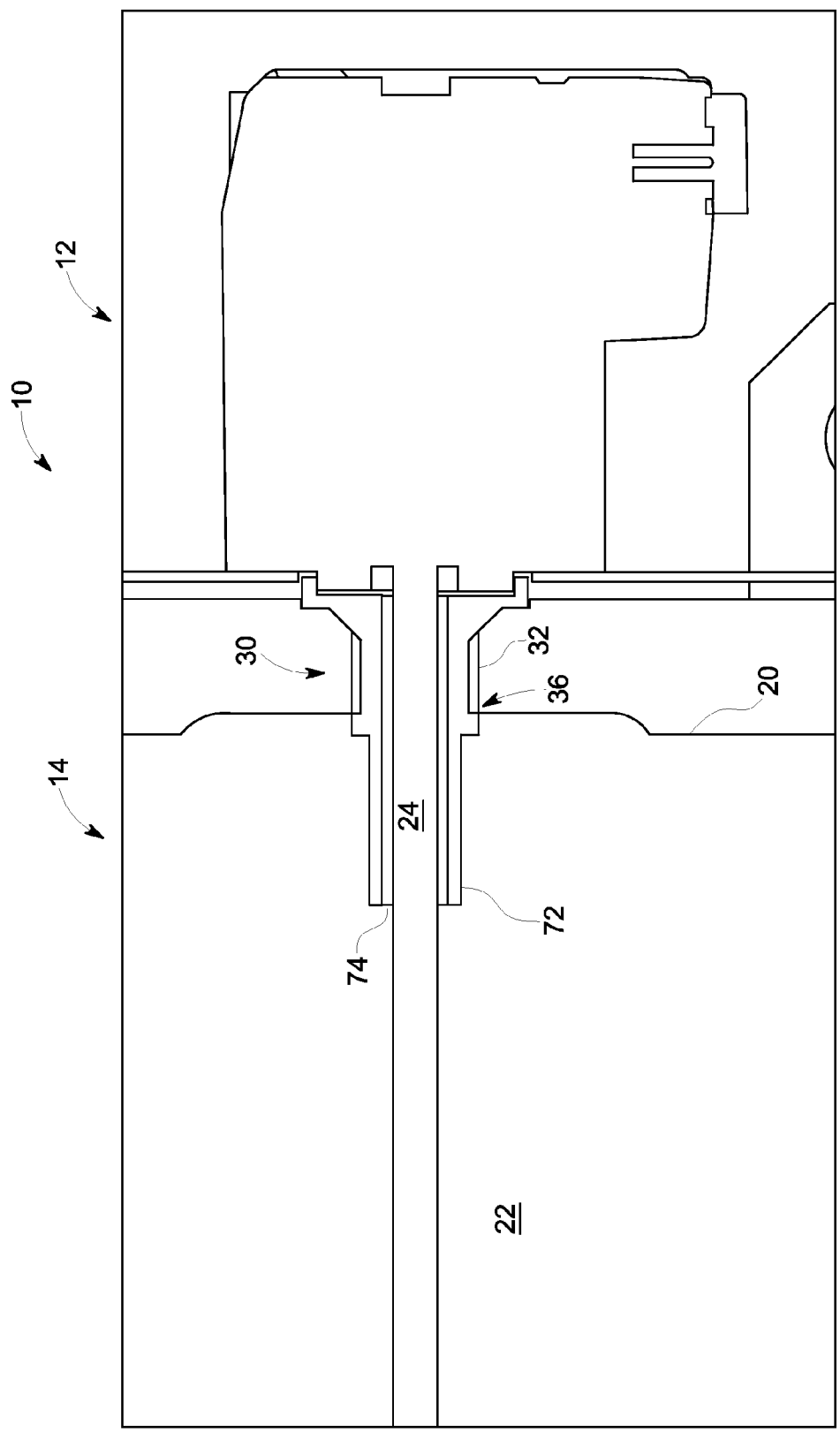
FIG. 4 is a block schematic diagram of a motor and driven device arrangement that incorporates a shaft alignment component according to an embodiment of the present invention.

Referring now to FIG. 4, a motor and driven device arrangement 10 is shown that includes a shaft alignment component 30 configured according to another embodiment of the invention. As shown in FIG. 4, a protective sheath 72 is formed on component 30 that extends out from the second end 36 of body portion 32 and into the interior volume 22 of housing 20. The protective sheath 72 is constructed as a hollow member and is configured to encase a portion of the rotatable shaft 24 of driven device 14 therein in order to provide an increased level of protection to the rotatable shaft 24. That is, it is recognized that during assembly of the arrangement 10, the rotatable shaft 24 can be prone to being damaged, and thus protective sheath 72 provides a safeguard against such damage.

As further shown in FIG. 4, shaft alignment component 30 also includes a stop feature 74 extending out from the second end 36 of body portion 32 and into the interior volume 22 of housing 20. The stop feature 74 acts as a hard stop for a moving component within the housing 20 by having a specified length of protrusion inside the volume 22 of the housing 20. The stop feature 74 thus functions to prevent run-off of such a moving component.

Beneficially, embodiments of component 30 thus function to provide for simpler and more efficient aligning of a rotatable shaft positioned within a housing of a driven device with a motor shaft of a motor positioned outside of the housing of the driven device. A chamfered feature of the component 30, and its interfacing with a countersunk feature of the housing of the driven device, provides for self-centering alignment of the rotatable shaft of the device with/to the component. Additionally, a locational fit inner diameter feature of the component 30, and its interfacing with an alignment hub of the motor, provides for simple alignment of the motor shaft with/to the component. The locational fit inner diameter feature of the component 30 also allows for stiffer (i.e., less flexible) couplings to be used between the component and the motor, which equates to more coupling stiffness and less windup.

Embodiments of component 30 also beneficially allow motors to be protected from radiation that might be emitted through the housing of the driven device by accommodating the placement of shielding material between the motor and the housing of the driven device. Additionally, the component 30 itself can also function to reduce the transfer of radiation between the driven device and the motor by being formed of a material specifically chosen for its radiation blocking properties, with the component being formed of a material different from that of the housing if desired.

As still a further benefit, the component 30 is formed separately from motor 12 and driven device 14, so as to provide increased flexibility in modifying and changing the component 30 as needed, rather than having to change an entire housing or machine features into the housing, so as to lower costs. Many functions are performed by component 30, including self-alignment and radiation blocking, thereby reducing complexity in the overall motor and driven device arrangement. The features incorporated for disassembly of the component from the motor and the driven device allow for easy disassembly at low cost and time, leading to maximum revenue to be gained through recycling of materials.

Therefore, according to one embodiment of the invention, a shaft alignment component for aligning a rotatable shaft positioned within a housing of a driven device with a motor shaft of a motor positioned outside of the housing of the driven device is provided. The shaft alignment component includes a body portion comprising a first end and a second end and having an opening formed therethrough extending from the first end to the second end to receive at least one of the rotatable shaft of the driven device and the motor shaft therein. The shaft alignment component also includes a first alignment feature configured to interface with an alignment hub on the motor so as to position the motor shaft along a centerline axis of the shaft alignment component and a second alignment feature comprising a chamfered surface configured to interface with a countersunk feature on the housing. The chamfered surface is configured to interface with the countersunk feature to self-align the shaft alignment component with the housing such that the rotatable shaft of the driven device is positioned along the centerline axis of the shaft alignment component and aligned with the motor shaft.

According to another embodiment of the invention, a shaft alignment component for aligning a rotatable shaft positioned within a housing of a driven device with a motor shaft of a motor positioned outside of the housing of the driven device is provided. The shaft alignment component includes a body portion comprising a first end and a second end, with the body portion having a hollow configuration so as to include an opening formed therethrough extending from the first end to the second end to receive at least one of the rotatable shaft of the driven device and the motor shaft therein. The shaft alignment component also includes a flange positioned on the first end of the body portion, with the flange comprising a locational fit inner diameter feature configured to interface with an alignment hub on the motor so as to position the motor shaft along a centerline axis of the shaft alignment component. The shaft alignment component further includes an attachment feature positioned on the second end of the body portion configured to mate with the housing of the driven device and a chamfered surface positioned between the flange and the attachment feature that tapers down from the flange to the body portion, with the chamfered surface configured to interface with a countersunk feature on the housing. The chamfered surface interfaces with the countersunk feature to self-align the shaft alignment component with the housing upon mating of the shaft alignment component with the housing, such that the rotatable shaft of the driven device is positioned along the centerline axis of the shaft alignment component so as to be aligned with the motor shaft According to yet another embodiment of the invention, a motor and driven device arrangement includes a motor having an alignment hub and a motor shaft extending axially outward from the alignment hub and a driven device having a housing enclosing a volume and a rotatable shaft positioned within the volume that is configured to couple with the motor shaft so as to be driven thereby, with the housing including a countersunk feature formed thereon. The arrangement also includes a shaft alignment component positioned between the motor and the driven device to facilitate alignment between the motor shaft and the rotatable shaft, with the shaft alignment component further including a body portion having an opening formed therethrough configured to receive at least one of the rotatable shaft and the motor shaft therein, a first alignment feature configured to interface with the alignment hub of the motor so as to position the motor shaft along a centerline axis of the shaft alignment component, and a second alignment feature comprising a chamfered surface configured to interface with the countersunk feature on the housing so as to self-align the rotatable shaft of the driven device with the centerline axis of the shaft alignment component upon attachment of the shaft alignment component to the housing. The rotatable shaft and the motor shaft are aligned upon attachment of the shaft alignment component to the alignment hub of the motor and the housing of the driven device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shaft alignment component for aligning a rotatable shaft positioned within a housing of a driven device with a motor shaft of a motor positioned outside of the housing of the driven device, the shaft alignment component comprising:
    a body portion comprising a first end and a second end and having an opening formed therethrough extending from the first end to the second end to receive at least one of the rotatable shaft of the driven device and the motor shaft therein;
    a first alignment feature configured to interface with an alignment hub on the motor so as to position the motor shaft along a centerline axis of the shaft alignment component; and
    a second alignment feature comprising a chamfered surface configured to interface with a countersunk feature on the housing;
    wherein the chamfered surface is configured to interface with the countersunk feature to self-align the shaft alignment component with the housing such that the rotatable shaft of the driven device is positioned along the centerline axis of the shaft alignment component and aligned with the motor shaft.

2. The shaft alignment component of claim 1 further comprising an attachment feature positioned on the second end of the body portion and configured to mate with the housing of the driven device.

3. The shaft alignment component of claim 2 wherein the attachment feature comprises a plurality of external threads configured to mate with the housing in a screw-like fashion.

4. The shaft alignment component of claim 1 wherein the first alignment feature comprises a flange having an outer diameter feature and an inner diameter feature, and wherein the inner diameter feature is configured to form a locational fit with the motor alignment hub so as to interface the motor with the shaft alignment component.

5. The shaft alignment component of claim 1 wherein the first alignment feature is axially offset from the second alignment feature so as to provide for placement of an intermediate layer about the first alignment feature and between the housing and the motor.

6. The shaft alignment component of claim 5 wherein the first alignment feature is configured to mate with the alignment hub on the motor through the intermediate layer.

7. The shaft alignment component of claim 1 further comprising a protective sheath extending out from the second end of the body portion and into an interior volume of the housing, the protective sheath comprising a hollow member configured to receive a portion of the rotatable shaft therein.

8. The shaft alignment component of claim 1 further comprising a stop feature extending out from the second end of the body portion and into an interior volume of the housing, the stop feature configured to prevent run-off between the shaft alignment component and the housing.

9. The shaft alignment component of claim 1 wherein the shaft alignment component is formed of a material having a higher density than the housing of the driven device, and wherein the material has a density sufficient to block x-ray radiation from passing therethrough.

10. The shaft alignment component of claim 1 further comprising at least one disassembly feature configured to enable manual removal of the shaft alignment component from the housing and the motor.

11. A shaft alignment component for aligning a rotatable shaft positioned within a housing of a driven device with a motor shaft of a motor positioned outside of the housing of the driven device, the shaft alignment component comprising:
    a body portion comprising a first end and a second end, the body portion having a hollow configuration so as to include an opening formed therethrough extending from the first end to the second end to receive at least one of the rotatable shaft of the driven device and the motor shaft therein;

a flange positioned on the first end of the body portion, the flange comprising a locational fit inner diameter feature configured to interface with an alignment hub on the motor so as to position the motor shaft along a centerline axis of the shaft alignment component;

an attachment feature positioned on the second end of the body portion and configured to mate with the housing of the driven device; and a chamfered surface positioned between the flange and the attachment feature and tapering down from the flange to the body portion, the chamfered surface configured to interface with a countersunk feature on the housing;

wherein the chamfered surface is configured to interface with the countersunk feature to self-align the shaft alignment component with the housing upon mating of the shaft alignment component with the housing, such that the rotatable shaft of the driven device is positioned along the centerline axis of the shaft alignment component so as to be aligned with the motor shaft.

12. The shaft alignment component of claim 11 wherein the flange is axially offset from the chamfered surface and has a width that defines a standoff distance between the motor and the housing of the driven device upon connection of the shaft alignment component to both of the motor and the driven device, and wherein the width of the flange is configured to accommodate placement of an intermediate material between the housing and the motor.

13. The shaft alignment component of claim 11 wherein the shaft alignment component is formed of a material having a higher density than the housing of the driven device, and wherein the material has a density sufficient to block x-ray radiation from passing therethrough.

14. The shaft alignment component of claim 11 further comprising a protective sheath extending out from the second end of the body portion and into an interior volume of the housing, the protective sheath comprising a hollow member configured to receive a portion of the rotatable shaft therein.

15. The shaft alignment component of claim 11 further comprising further comprising a stop feature extending out from the second end of the body portion and into an interior volume of the housing, the stop feature configured to prevent run-off between the shaft alignment component and the housing.

16. A motor and driven device arrangement comprising:
   a motor comprising an alignment hub and a motor shaft extending axially outward from the alignment hub;
   a driven device comprising a housing enclosing a volume and a rotatable shaft positioned within the volume that is configured to couple with the motor shaft so as to be driven thereby, the housing including a countersunk feature formed thereon;
   a shaft alignment component positioned between the motor and the driven device to facilitate alignment between the motor shaft and the rotatable shaft, the shaft alignment component comprising:
      a body portion having an opening formed therethrough configured to receive at least one of the rotatable shaft and the motor shaft therein;
      a first alignment feature configured to interface with the alignment hub of the motor so as to position the motor shaft along a centerline axis of the shaft alignment component; and
      a second alignment feature comprising a chamfered surface configured to interface with the countersunk feature on the housing so as to self-align the rotatable shaft of the driven device with the centerline axis of the shaft alignment component upon attachment of the shaft alignment component to the housing;
      wherein the rotatable shaft and the motor shaft are aligned upon attachment of the shaft alignment component to the alignment hub of the motor and the housing of the driven device.

17. The arrangement of claim 16 wherein the first alignment feature comprises a flange having an outer diameter feature and an inner diameter feature, and wherein the inner diameter feature is configured to form a locational fit with the motor alignment hub to position the motor relative to the shaft alignment component.

18. The arrangement of claim 17 further comprising an intermediate material positioned between the housing and the motor, the intermediate material positioned about the shaft alignment component and having a thickness less than or equal to a thickness of the flange.

19. The arrangement of claim 16 wherein the shaft alignment component further comprises:
   a protective sheath extending out from the body portion and into the volume of the housing, the protective sheath comprising a hollow member configured to receive a portion of the rotatable shaft therein; and
   a stop feature extending out from the body portion and into the volume of the housing, the stop feature configured to prevent run-off between the shaft alignment component and the driven device.

20. The arrangement of claim 16 wherein the shaft alignment component further comprises:
   an assembly feature configured to secure the shaft alignment component to the housing of the driven device without the use of additional fasteners; and
   a disassembly feature configured to enable manual removal of the shaft alignment component from the housing and the motor.

* * * * *